US008159447B2

(12) United States Patent
Sashida

(10) Patent No.: US 8,159,447 B2

(45) Date of Patent: Apr. 17, 2012

(54) DISPLAY DRIVING APPARATUS AND DISPLAY APPARATUS COMPRISING THE SAME

(75) Inventor: Hideki Sashida, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1185 days.

(21) Appl. No.: 11/899,581

(22) Filed: Sep. 6, 2007

(65) Prior Publication Data

US 2008/0074404 A1 Mar. 27, 2008

(30) Foreign Application Priority Data

Sep. 25, 2006 (JP) ................................ 2006-259424

(51) Int. Cl.

*G09G 3/36* (2006.01)
*G09G 5/00* (2006.01)
*G06F 3/038* (2006.01)

(52) U.S. Cl. ........... 345/100; 345/204; 345/94; 345/103

(58) Field of Classification Search .......... 345/204-206, 345/690, 87, 89, 94, 103, 100; 349/149, 349/152

See application file for complete search history.

(56) References Cited

U.S. PATENT DOCUMENTS

| | | | | |
|---|---|---|---|---|
| 6,707,440 | B2 * | 3/2004 | Aoki | 345/87 |
| 6,853,361 | B2 | 2/2005 | Tsuyuki et al. | |
| 7,433,008 | B2 * | 10/2008 | Kim | 349/152 |
| 2002/0083219 | A1 | 6/2002 | Aoki | |
| 2003/0117353 | A1 * | 6/2003 | Moon | 345/87 |
| 2004/0189573 | A1 * | 9/2004 | Lee et al. | 345/94 |
| 2006/0066603 | A1 * | 3/2006 | Obayashi et al. | 345/204 |

FOREIGN PATENT DOCUMENTS

| | | | |
|---|---|---|---|
| CN | 1532759 | A | 9/2004 |
| CN | 1532795 | A | 9/2004 |
| CN | 2757167 | Y | 2/2006 |
| JP | 4-293014 | A | 10/1992 |

(Continued)

OTHER PUBLICATIONS

Japanese Office Action dated Feb. 3, 2009 (3 pages), and English translation thereof (4 pages) issued in counterpart Japanese Application No. 2006-259424.

Chinese Office Action dated Jul. 21, 2009 and English translation thereof issued in a counterpart Chinese Application No. 2007101537979.

(Continued)

*Primary Examiner* — Quan-Zhen Wang
*Assistant Examiner* — Ilana Spar
(74) *Attorney, Agent, or Firm* — Holtz, Holtz, Goodman & Chick, PC

(57) ABSTRACT

A display driving apparatus that drives display pixels having pixel electrodes arrayed in rows and columns on the basis of display data includes a signal generating circuit generates a driving signal for sequentially sets the respective display pixels corresponding to the respective rows in a selected state, and applies a signal voltage corresponding to a gradation value of the display data to the pixel electrode of each display pixel. The display driving apparatus also includes a correcting circuit that corrects the driving signal in accordance with selecting operation by the driving signal for each display pixel, and brings the magnitude of the signal voltage with respect to the gradation value of the display data, which is to be applied to the pixel electrode of each display pixel, close to the same value, and applies the corrected driving signal to each of the display pixels set in the selected state.

5 Claims, 5 Drawing Sheets

FOREIGN PATENT DOCUMENTS

| | | | | |
|---|---|---|---|---|
| JP | 10-186325 | A | | 7/1998 |
| JP | 2002-123228 | A | | 4/2002 |
| JP | 2002-182614 | A | | 6/2002 |
| JP | 2004-086093 | A | | 3/2004 |
| JP | 2004086093 | A | * | 3/2004 |
| JP | 2006-133511 | A | | 5/2006 |
| KR | 1999-0013875 | A | | 2/1999 |
| KR | 2002-0056694 | A | | 7/2002 |
| KR | 2002056694 | A | * | 7/2002 |
| KR | 2003-0088725 | A | | 11/2003 |

OTHER PUBLICATIONS

Japanese Office Action (and English translation thereof) dated Sep. 30, 2008, issued in a counterpart Japanese Application.

Korean Office Action (and English translation thereof) dated Aug. 27, 2008, issued in a counterpart Chinese Application.

Chinese Office Action dated Jul. 12, 2011 (and English translation thereof) in counterpart Chinese Application No. 200710153797.9.

Japanese Office Action dated Nov. 8, 2011 (and English translation thereof) in counterpart Japanese Application No. 2009-048733.

* cited by examiner

DISPLAY DRIVING APPARATUS AND DISPLAY APPARATUS COMPRISING THE SAME

CROSS-REFERENCE TO RELATED APPLICATIONS

This application is based upon and claims the benefit of priority from prior Japanese Patent Application No. 2006-259424, filed Sep. 25, 2006, the entire contents of which are incorporated herein by reference.

BACKGROUND OF THE INVENTION

1. Field of the Invention

The present invention relates to a display driving apparatus for driving a display panel and a display apparatus that comprises the display driving apparatus and displays an image by driving the display panel.

2. Description of the Related Art

As display panels used for liquid crystal display apparatuses, simple matrix display panels and active matrix display panels are known. According to an active matrix display panel of these display panels, scanning lines (gate lines) intersect signal lines (source lines) at right angles on the display panel, and pixel electrodes are arranged near the intersections between the gate lines and the source lines through thin film transistors (to be referred to as TFTs hereinafter). Display pixels are formed by filling the spaces between these pixel electrodes and a counter electrode facing them with a liquid crystal. Gradation signals are applied to display pixels set in the selected state by scanning signals input through gate lines to change the aligned state of the liquid crystal, thereby displaying an image.

In some form of mounting a display driving apparatus for driving such a display panel on the display panel, semiconductor devices such as a gate driver for driving gate lines, a source driver for driving source lines, and the like are mounted on one edge side of the display panel. That is, in this form, semiconductor devices such as a gate driver and a source driver are mounted in non-display region on the lower edge of the display panel, part of the lower edge of the board of the display panel on a side on which the pixel electrodes are formed is made to protrude, and the source and gate drivers are amounted on the protruding portion. This makes it possible to decrease the widths of non-display regions of the display panel on which interconnections extend in the horizontal direction.

It is generally known that in a liquid crystal display apparatus, the magnitude of a signal voltage applied to the pixel electrode of a display pixel at a trailing edge of a scanning signal input to a TFT becomes equal to a voltage value smaller than the voltage value of the gradation signal output from the source driver by a feedthrough voltage ΔV proportional to the amplitude of the scanning signal. In the arrangement in which the source and gate drivers are mounted on one edge side of the display panel as described above, interconnections for connecting the respective output terminals of the gate drivers to the respective gate line terminals formed on a side edge of the display panel are routed along a side edge of the display panel. The lengths of interconnections (interconnection lengths) vary depending on whether the interconnections are located on a near side or far side of the gate driver. These differences in interconnection length produce differences in interconnection resistance. Due to the differences in interconnection resistance, scanning signals input to display pixels differ in magnitude Vg for each row, resulting in differences in feedthrough voltage ΔV for each row.

BRIEF SUMMARY OF THE INVENTION

The present invention has an advantage of providing a display driving apparatus that can obtain good display quality by suppressing a deterioration in display quality due to differences in the feedthrough voltage ΔV for each row of a display panel, and a display apparatus comprising the same.

A first display driving apparatus for obtaining the above advantage according to the present invention is a display driving apparatus that drives display pixels including pixel electrodes arrayed in rows and columns on the basis of display data, the apparatus including a signal generating circuit that generates a driving signal for sequentially sets the respective display pixels corresponding to the respective rows in a selected state, and applies a signal voltage corresponding to a gradation value of the display data to a pixel electrode of each of the display pixels, and a correcting circuit that corrects the driving signal in accordance with selecting operation by the driving signal for each of the display pixels, and brings a magnitude of the signal voltage with respect to a gradation value of the display data, which is to be applied to the pixel electrode of each of the display pixels, close to the same value, and applies the corrected driving signal to each of the display pixels set in the selected state.

A second display driving apparatus for obtaining the above advantage according to the present invention is a display driving apparatus that drives display pixels having pixel electrodes arrayed in rows and columns, the apparatus including selection means for generating scanning signals for sequentially setting the respective display pixels in a selected state, and correction means for correcting an amplitude of the scanning signal and bringing an amount of voltage drop caused at the pixel electrode of the display pixel of each of the rows close to a predetermined amount in accordance with a trailing edge of the scanning signal, and applies the corrected scanning signal to the display pixels set in the selected state.

A first display apparatus for obtaining the above advantage according to the present invention is a display apparatus that performs image display on the basis of display data, the apparatus including a display panel having a display area in which display pixels are arrayed, the display panel having scanning lines arrayed in a row direction, signal lines arrayed in a column direction, and pixel electrodes near intersections between the scanning lines and the signal lines, a signal generating circuit that generates a driving signal for sequentially sets the display pixels corresponding to the respective scanning lines in a selected state, and applies a signal voltage corresponding to a gradation value of display data to a pixel electrode of each of the display pixels, and a correcting circuit that corrects the driving signal in accordance with selecting operation by the driving signal of each of the display pixels, and brings a magnitude of the signal voltage with respect to a gradation value of the display data, which is to be applied to the pixel electrode of each of the display pixels, close to the same value, and applies the corrected driving signal to each of the display pixels set in the selected state.

A second display apparatus for obtaining the above advantage according to the present invention is a display apparatus that performs image display on the basis of display data, the apparatus including a display panel having a display area in which display pixels are arrayed, the display panel having scanning lines arrayed in a row direction, signal lines arrayed in a column direction, and pixel electrodes near intersections between the scanning lines and the signal lines, a signal generating circuit arranged along one edge side of the display area of the display panel and having a scanning side driving circuit that has at least output terminals corresponding to the respective scanning lines, and sequentially sets the display pixels in the selected state by sequentially outputting scanning signals from the respective output terminals, and a signal side driving circuit that generates a gradation signal having a voltage value corresponding to a gradation value of the display data, and supplies the gradation signal to each of the display pixels set in the selected state, routed interconnections each having one end connecting to an end portion of the scanning line and the other end connecting to an output terminal of the scanning side driving circuit, each routed interconnection extending along an edge perpendicular to the edge side of the display panel on which the signal generating circuit is provided, and a correcting circuit that corrects an amplitude of the scanning signal output from each of the output terminals of the scanning side driving circuit, and brings an amount of voltage drop caused at the pixel electrode of the display pixel corresponding to each of the scanning lines close to a predetermined amount through each of the routed interconnections in accordance with a trailing edge of the scanning signal.

A third display apparatus for obtaining the above advantage according to the present invention is a display apparatus that performs image display based on display data, the apparatus including a display panel including a display area in which display pixels are arrayed, the display panel having scanning lines arrayed in a row direction, signal lines arrayed in a column direction, and pixel electrodes near intersections between the scanning lines and the signal lines, selection means for generating scanning signals for sequentially setting the corresponding display pixels in a selected state, signal driving means for generating a gradation signal having a voltage value corresponding to a gradation value of the display data and supplying the signal to each of the display pixels set in the selected state, and correction means for correcting an amplitude of the scanning signal generated by the selection means, and bringing an amount of voltage drop caused at the pixel electrode of the display pixel corresponding to each of the scanning lines to a predetermined amount in accordance with a trailing edge of the scanning signal, and applies the corrected scanning signal to the display pixels set in the selected state.

A fourth display apparatus for obtaining the above advantage according to the present invention is a display apparatus that performs image display based on display data, the apparatus including a display panel including display pixels having scanning lines arrayed in a row direction, signal lines arrayed in a column direction, and pixel electrodes arrayed near interconnections between the scanning lines and the signal lines, and a counter electrode provided to face the pixel electrodes, selection means for sequentially applying scanning signals to the respective scanning lines to sequentially set the corresponding display pixels in a selected state, signal driving means for generating a gradation signal having a voltage value corresponding to a gradation value of the display data and supplying the signal to each of the display pixels set in the selected state, counter electrode driving means for generating a common signal for driving the counter electrode, and correction means for correcting a voltage value of the common signal generated by the counter electrode driving means in accordance with an amount of voltage drop caused at a pixel electrode of the display pixel in accordance with a trailing edge of the scanning signal, and applying the corrected common signal to the counter electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A display driving apparatus and a display apparatus comprising the same according to the present invention will be described in detail below with reference to the views of the accompanying drawing.

First Embodiment

Figure 1:
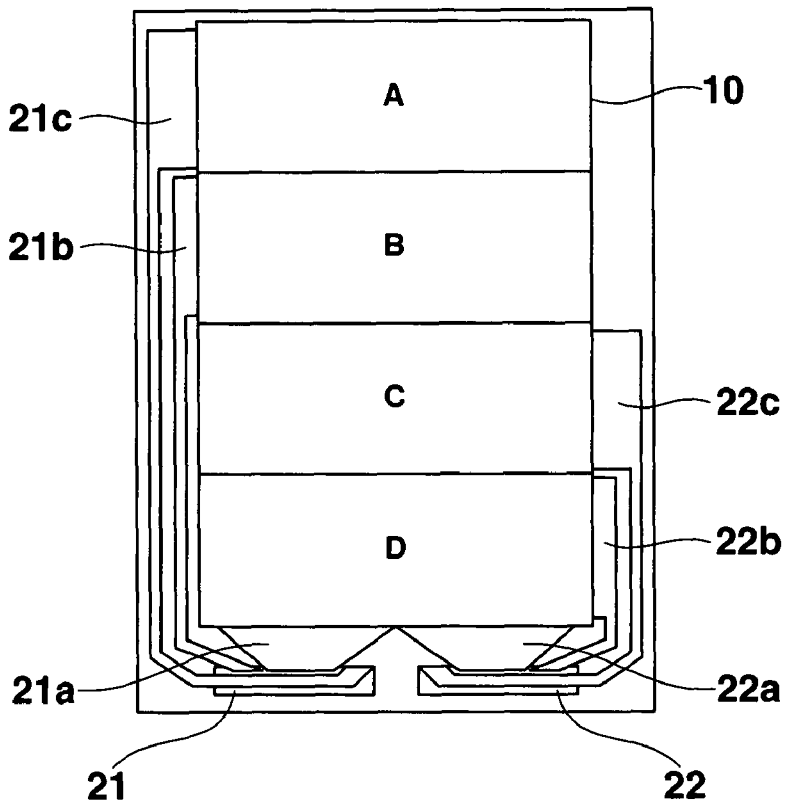
FIG. 1 is a view showing the arrangement of a display apparatus to which a display driving apparatus according to the first embodiment of the present invention is applied.

FIG. 1 is a view showing the arrangement of a display apparatus to which a display driving apparatus according to the first embodiment of the present invention is applied.

Figure 2:
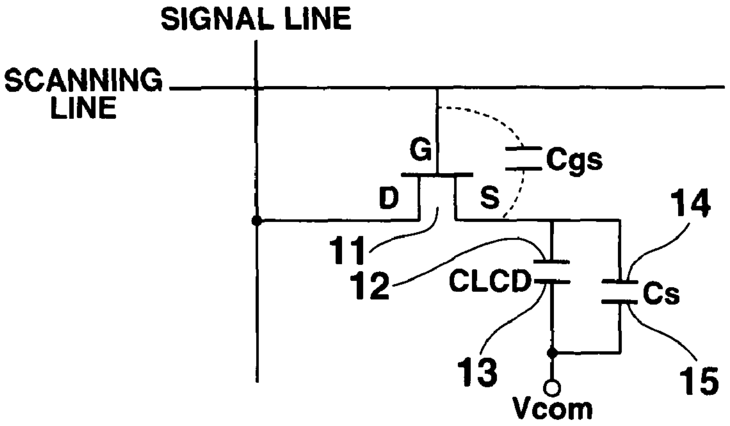
FIG. 2 is an equivalent circuit of one display pixel provided on a display panel.

FIG. 2 is an equivalent circuit of one display pixel provided on a display panel.

The display apparatus shown in FIG. 1 comprises a display panel 10 and drivers 21 and 22. The drivers 21 and 22 are mounted side by side on one edge side of the display panel 10 (on the lower edge side in FIG. 1).

The display panel 10 comprises scanning lines (gate lines) arrayed in the row direction and signal lines (source lines) arrayed in the column direction. The display pixel shown in FIG. 2 is provided near the intersection between a corresponding gate line and a corresponding source line.

Referring to FIG. 1, regions A, B, C, and D on the display panel 10 are obtained by dividing the scanning lines on the display panel 10 into four regions in correspondence with the connection relationship between the gate driver of the drivers 21 and 22 and the respective scanning lines on the display panel 10. This arrangement will be described in detail later.

As shown in FIG. 2, a gate electrode G of a thin film transistor (TFT) 11 of each display pixel is connected to a corresponding gate line, and a drain electrode D of the TFT 11 is connected to a source line. In addition, a pixel electrode 12 and one electrode 14 of a storage capacitance are connected to a source electrode S of the TFT 11. A counter electrode 13 is placed to face the pixel electrode 12. The counter electrode 13 is connected to a common signal line together with the other electrode 15 of the storage capacitance, and receives a common signal Vcom.

The drivers 21 and 22 constitute a display driving apparatus incorporating a gate driver for driving the gate lines of the display panel 10, a source driver (signal side driving circuit) for driving the source lines of the display panel 10, a common signal output circuit (counter electrode driving circuit) that generates a common signal and outputs it to each display pixel, a controller that performs various kinds of control operations such as driving timing control for the gate and source drivers and the common signal output circuit, and the like.

The driver 21 is configured to drive the gate lines in the upper regions (the regions A and B in FIG. 1) of the display panel 10 and the source lines in the left region. The driver 22 is configured to drive the gate lines in the lower regions (the regions C and D in FIG. 1) of the display panel 10 and the source lines in the right region.

As shown in FIG. 1, the driver 21 is mounted on the left side of the lower edge of the display panel 10. A source driver is formed in the middle region of the driver 21 in the horizontal direction. The output terminals of the source driver are connected to the respective source line terminals formed in the left region on the lower edge of the display panel 10 through a source interconnection group 21*a* including source interconnections. Gate drivers are formed on two sides adjacent to the source driver in the horizontal direction. Each output terminal of the left gate driver of these gate drivers is connected to one end of a gate interconnection group 21*b* including gate interconnections (routed interconnections). The gate interconnection group 21*b* is formed in a left edge region of the display panel 10, with the other end being connected to each gate line terminal formed in the region B of the display panel 10. Each output terminal of the right gate driver is connected to one end of a gate interconnection group 21*c* including gate interconnections (routed interconnections) detouring the source interconnection group 21*a* and the gate interconnection group 21*b*. The gate interconnection group 21*c* is formed in a left edge region of the display panel 10, with the other end being connected to each gate line terminal formed in the region A of the display panel 10.

The driver 22 is mounted on the right side of the lower edge of the display panel 10. A source driver is formed in the middle region of the driver 22 in the horizontal direction. The output terminals of the source driver are connected to the respective source line terminals formed in the right region on the lower edge of the display panel 10 through a source interconnection group 22*a* including source interconnections. Gate drivers are formed on two sides adjacent to the source driver in the horizontal direction. Each output terminal of the right gate driver of these gate drivers is connected to one end of a gate interconnection group 22*b* including gate interconnections (routed interconnections). The gate interconnection group 22*b* is formed in a right edge region of the display panel 10, with the other end being connected to each gate line terminal formed in the region D of the display panel 10. Each output terminal of the right gate driver is connected to one end of a gate interconnection group 22*c* including gate interconnections (routed interconnections) detouring the source interconnection group 22*a* and the gate interconnection group 22*b*. The gate interconnection group 22*c* is formed in a right edge region of the display panel 10, with the other end being connected to each gate line terminal formed in the region C of the display panel 10.

The above embodiment has exemplified the arrangement comprising the two drivers 21 and 22 and drives the overall display panel 10 by using the drivers. Obviously, however, it suffices to integrate the two drivers into one driver and drive the display panel 10 by using the driver.

Figure 3:
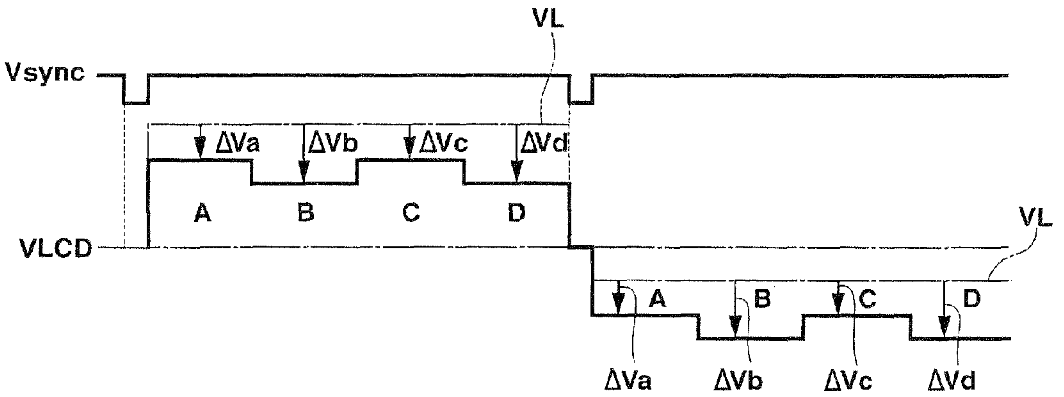
FIG. 3 is a view showing a voltage VLCD actually applied to a given column of display pixels in a conventional driving scheme in which the amplitudes of scanning signals applied to the respective scanning lines are made constant.

FIG. 3 is a view showing a voltage VLCD actually applied to a given column of display pixels on the display panel in a conventional driving scheme in which the amplitudes of scanning signals applied to the respective scanning lines are made constant.

Referring to FIG. 3, for the sake of simplicity, assume that field inversion driving is performed, in which the polarity of a gradation signal output from an output terminal is inverted for each field interval, and a signal VL indicated by the broken line is a gradation signal output from the source driver. This operation exemplifies a case wherein the magnitudes of gradation signals output from the respective output terminals of the source driver are constant, i.e., single gray-level display is performed.

It is known that in the liquid crystal display apparatus, at a trailing edge of a scanning signal input to a TFT, the magnitude of a signal voltage (liquid crystal application voltage VLCD) applied to the pixel electrode 12 becomes a voltage value smaller than the voltage value of a gradation signal output from the source driver by a feedthrough voltage ΔV in accordance with a parasitic capacitance Cgs between the gate and source of the TFT, a liquid crystal capacitance CLCD formed between the pixel electrode and the counter electrode, a storage capacitance Cs, and a magnitude (amplitude) Vg of a scanning signal applied to the TFT. The feedthrough voltage ΔV is represented by equation (1):

$$\Delta V=(Cgs/Cs+CLCD+Cgs)\times Vg. \quad (1)$$

In the arrangement in which the source and gate drivers are mounted on one edge side of the display panel as described above, the gate interconnection groups 21*b*, 21*c*, 22*b*, and 22*c* are routed from the gate drivers to the gate line terminals formed on a side edge of the display panel, as shown FIG. 1. The respective gate interconnections have different lengths (interconnection lengths). In general, the gate interconnection group 21*c* is longer in interconnection length than the gate interconnection group 22*b*, and the gate interconnection group 21*c* is longer in interconnection length than the gate interconnection group 21*b*. In addition, the gate interconnections included in the gate interconnection groups 21*b* and 22*c* have different interconnection lengths. These differences in interconnection length produce differences in interconnection resistance between the respective gate interconnections. The gate interconnection group 21*c* is larger in interconnection resistance than the gate interconnection group 22*b*, and the gate interconnection group 21*c* is larger in interconnection resistance than the gate interconnection group 21*b*. As this interconnection resistance increases, the amount of voltage drop due to the interconnection resistance increases, and the rise/decay time of the waveform of a scanning signal due to the interconnection resistance increases. As a result, an amplitude Vg of a scanning signal input to a display pixel substantially decreases. As the amplitude Vg of the scanning signal decreases, the feedthrough voltage ΔV decreases. As a consequence, the feedthrough voltage ΔV becomes inconstant for each row.

Referring to FIG. 3, reference symbols ΔVa, ΔVb, ΔVc, and ΔVd denote feedthrough voltages ΔV in the regions A, B, C, and D on the display panel 10. For the sake of simplicity, FIG. 3 shows a case wherein field inversion driving is performed. However, the arrangement of this embodiment can also be applied to line inversion driving in a similar manner.

As shown in FIG. 3, when a vertical synchronization signal Vsync is input to the driver, the gate driver sequentially outputs scanning signals to sequentially select display pixels starting from display pixels on the uppermost row on the display panel 10. With this operation, the source driver inputs gradation signals to the selected display pixels. The potential difference between such a gradation signal and the common signal corresponds to the voltage VLCD shown in FIG. 3.

In the display apparatus with the arrangement shown in FIG. 1, the gate interconnections have different interconnection lengths, and hence differ in interconnection resistance, so that the scanning signals Vg input to the respective gate lines substantially differ in magnitude and the feedthrough voltage ΔV varies for each row. For this reason, even if the magnitudes of gradation signals output from the source driver are constant, the liquid crystal application voltage VLCD actually applied to the pixel electrode of each display pixel becomes a voltage value smaller than the voltage value of a gradation signal output from the source driver by the feedthrough voltage ΔV, and hence does not become constant within one field (or one frame), as shown in FIG. 3.

Referring to FIG. 3, for the sake of convenience, assume that the liquid crystal application voltages VLCD are constant in the regions A, B, C, and D. In practice, since the gate interconnection lengths differ within each region, the voltage ΔV varies for each gate line even within region. As a consequence, the liquid crystal application voltage VLCD does not become constant within each region in a strict sense. Although it depends on the size of each region, if the display panel 10 is relatively small such that it is used for the display unit of a cellular phone, since the size of one region is relatively small, the differences between the liquid crystal application voltages VLCD within one region are indistinguishably small. Accordingly, for the sake of convenience, it can be safely said that the liquid crystal application voltage VLCD is regarded as constant.

In contrast to this, the differences in the liquid crystal application voltage VLCD between the regions are relatively large. As a result, display uniformity may not be maintained. This may cause display failure such as strip-shaped display nonuniformity or flicker (on the screen).

The first embodiment is configured to make the voltage ΔV almost constant by controlling the magnitude of the scanning signal Vg, thereby improving the display quality.

Figure 4:
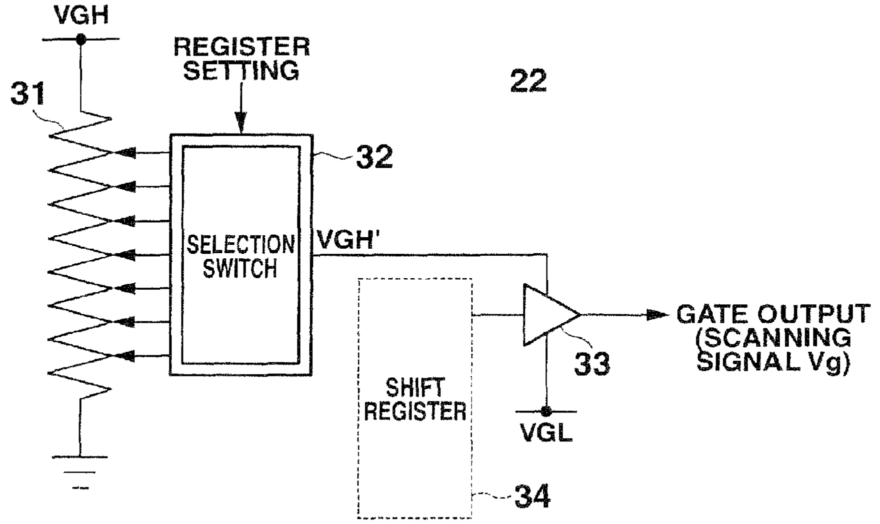
FIG. 4 is a circuit diagram showing the arrangement of the main part of a gate driver in the first embodiment.

FIG. 4 is a circuit diagram showing the arrangement of the main part of the gate driver in the first embodiment.

Figure 5A:
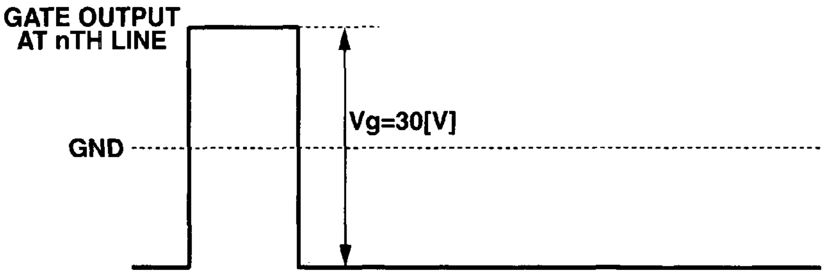
FIGS. 5A and 5B are views showing scanning signals in the first embodiment.
Figure 5B:
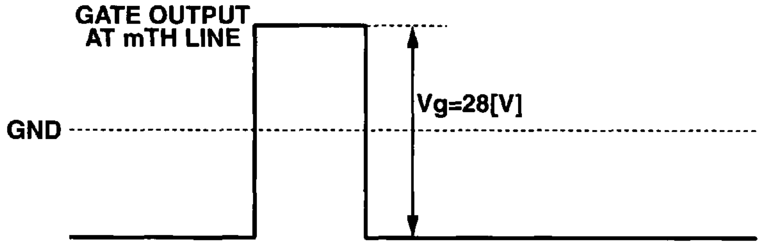

FIGS. 5A and 5B are views showing scanning signals in the first embodiment.

The circuit shown in FIG. 4 is provided in correspondence with each output terminal of the gate driver. FIG. 4 shows a portion associated with one of the output terminals.

As shown in FIG. 4, this circuit comprises a resistance load 31, a selection switch 32, and a gate output amplifier 33, and is connected to each output terminal of a shift register 34 in the gate driver.

The resistance load 31 is connected between a voltage VGH and the ground and resistance-divides the voltage VGH. The selection switch 32 selects a voltage VGH' with a desired magnitude at the resistance load 31 in accordance with register setting made by the controller, and outputs the voltage VGH' as a bias voltage to the gate output amplifier 33. With this operation, the high level side voltage of the scanning signal Vg output from the gate output amplifier 33 becomes the voltage VGH'. The low-level voltage is a voltage VGL. The voltage VGH' is a voltage for setting the TFT 11 of a display pixel in the selected state (ON state), and is set to a proper value for each row.

The gate output amplifier 33 outputs either the voltage VGH' set by the selection switch 32 or the voltage signal VGL for setting the TFT 11 of a display pixel in the unselected state (OFF state) as the scanning signal Vg to a corresponding gate line in accordance with a vertical control signal from the controller.

The arrangement shown in FIG. 4 can set the magnitude (amplitude) of the scanning signal Vg to a desired value for each gate line as shown in FIG. 5A or 5B. This allows the value of the feedthrough voltage ΔV to be corrected to a desired value for each gate line.

Assume that the scanning signal Vg at the nth line shown in FIG. 5A is ±15 [V] (the potential difference (amplitude) between VGH' and VGL is 30 [V]), and the scanning signal Vg at mth line shown in FIG. 5B is ±14 [V] (the potential difference (amplitude) between VGH' and VGL is 28 [V]). In this case, the voltage ΔV between them can be changed by about 7%. Setting the amount of change in ΔV obtained by changing the magnitude of the scanning signal Vg to a value that compensates for the difference in the feedthrough voltage ΔV for each gate line due to the interconnection resistance of the gate interconnection between the gate driver and the display panel 10 allows the value of the feedthrough voltage ΔV at each gate line to be brought close to a uniform value.

Assume that, as shown in FIG. 3, in the conventional driving scheme, at each row in the regions A and C of the display panel 10, the feedthrough voltage ΔV is relatively low as compared with a given reference feedthrough voltage ΔV (that allows to obtain a desired liquid crystal application voltage VLCD), and, for example, the interconnection resistance of the gate interconnections is relatively large. At such a row, the voltage to be selected by the selection switch 32 is set to be higher than a reference voltage selected with respect to the reference feedthrough voltage ΔV to increase the magnitude (amplitude) of the scanning signal Vg more than the voltage value set with respect to the reference feedthrough voltage ΔV.

In addition, assume that, in the conventional driving scheme, at each row in the regions B and D of the display panel 10, the feedthrough voltage ΔV is relatively high as compared with a given reference feedthrough voltage ΔV, and, for example, the interconnection resistance of the gate interconnections is relatively small. At such a row, the voltage to be selected by the selection switch 32 is set to be lower than a reference voltage selected with respect to the reference feedthrough voltage ΔV to decrease the magnitude (amplitude) of the scanning signal Vg more than the voltage value set with respect to the reference feedthrough voltage ΔV. This can bring the magnitude of the feedthrough voltage ΔV for each row of the display panel 10 close to a uniform value. This allows obtainment of uniform display throughout the display panel 10.

As described above, according to the first embodiment, correcting the magnitude (amplitude) of a scanning signal output from the gate driver for each row allows ΔV at each gate line to be brought close to a uniform value. This allows improvement of the display quality.

According to the above description, the circuit shown in FIG. 4 that sets the magnitude of the scanning signal Vg is provided for each row of the display panel. However, for example, it suffices to provide a circuit that sets the magnitude of the scanning signal Vg for each of the left and right gate drivers of the drivers 21 and 22 by making the magnitudes of the scanning signals Vg in the regions A, B, C, and D of the display panel 10 uniform.

In the arrangement shown in FIG. 1, differences in interconnection resistance (interconnection length in particular) between the gate interconnections produce differences in ΔV. As indicated by equation (1), the feedthrough voltage ΔV also changes depending on the parasitic capacitance between the gate and source of the TFT 11, the liquid crystal capacitance, and the storage capacitance. Accordingly, these variations also cause differences in the feedthrough voltage ΔV. In this case as well, measuring, for example, the feedthrough voltage ΔV for each row and changing the magnitude of the scanning signal Vg for each row in accordance with the measurement can bring the feedthrough voltage ΔV for each gate line close to a constant value.

Figure 6:
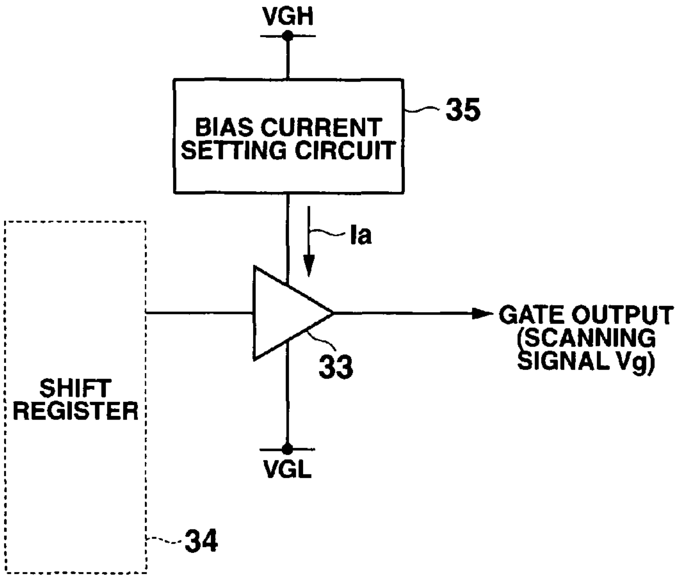
FIG. 6 is a circuit diagram showing the arrangement of the main part of a gate driver in a modification of the first embodiment.
Figure 7:
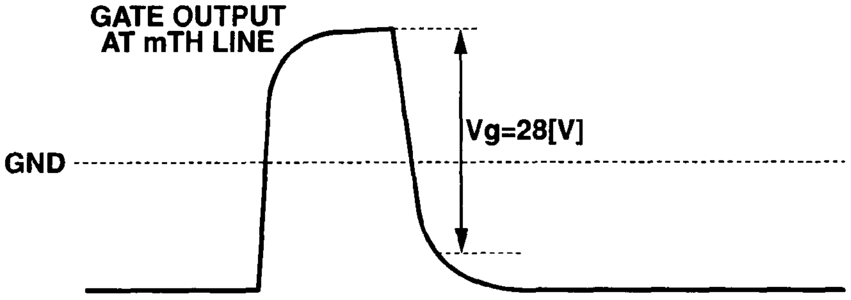
FIG. 7 is a graph showing a scanning signal in a modification of the first embodiment.

FIG. 6 is a circuit diagram showing the arrangement of the main part of the gate driver in the first embodiment. FIG. 7 is a view showing a scanning signal in a modification of the first embodiment.

In the first embodiment, the value of the bias voltage of the gate output amplifier 33 that sets the high level side voltage of the scanning signal Vg is changed as needed to change the amplitude of the scanning signal Vg, thereby changing the feedthrough voltage ΔV.

In contrast to this, as shown in FIG. 6, the above arrangement may comprise a bias current setting circuit 35 that can change the value of a bias current supplied to the gate output amplifier 33 to make the bias voltage applied to the gate output amplifier 33 constant and change the value of the bias current supplied to the gate output amplifier 33, thereby changing the driving capability of the gate output amplifier 33.

In this case, for example, the value of the bias current supplied to the gate output amplifier 33 is reduced to make driving capability of the gate output amplifier 33 relatively low, thereby increasingly rounding the waveform of a scanning signal to be applied to a gate line through a gate interconnection, as shown in FIG. 7. In addition, increasing the rise time/decay time of the scanning signal allows decrement of the amplitude Vg of the scanning signal to be substantially applied to a display pixel, thereby decreasing the magnitude of the feedthrough voltage ΔV.

As described above, it suffices to change the amplitude Vg of a scanning signal to be substantially applied to a display pixel by changing the driving capability of the gate output amplifier 33 and change the magnitude of the feedthrough voltage ΔV.

Second Embodiment

The second embodiment of the present invention will be described next. The second embodiment of the present invention is a technique of controlling a voltage VLCD to be applied to a display pixel by correcting a gradation signal itself output from a source driver in consideration of a difference in ΔV for each row.

Figure 8:
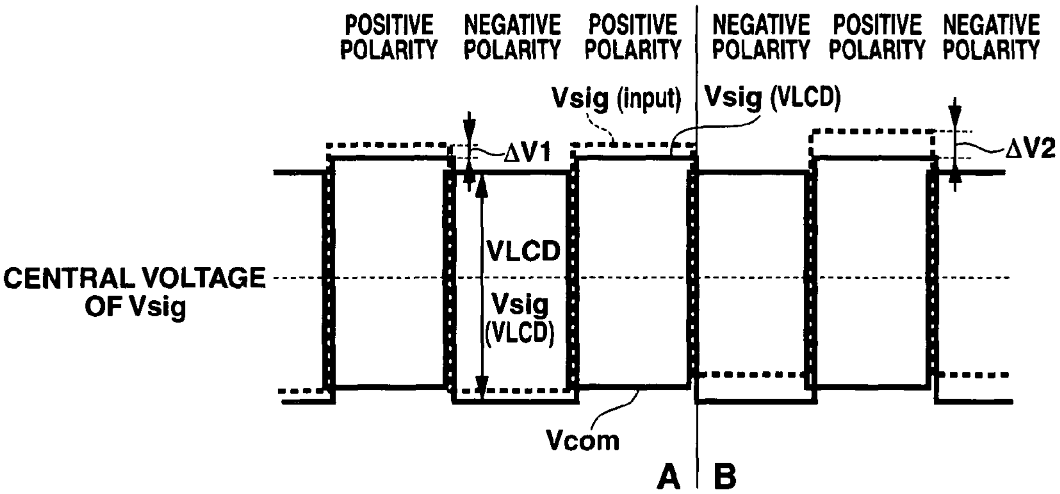
FIG. 8 is a view for explaining the concept of a technique according to the second embodiment.

FIG. 8 is a view for explaining the concept of the technique according to the second embodiment.

Referring to FIG. 8, reference symbol Vsig(input) denotes a waveform indicating a change in the gradation signal output from one output terminal of the source driver for each row; Vsig(VLCD), the waveform of a liquid crystal application voltage actually applied to a pixel electrode 12; and, Vcom, the waveform of a common signal input to the counter electrode 13.

FIG. 8 shows a row near the boundary between the regions A and B in FIG. 1. For the sake of simplicity, FIG. 8 also shows a case wherein single gray-level display is performed.

Although FIG. 8 shows an example of line inversion driving, in which the polarities of the gradation signal Vsig(input) and common signal Vcom are inverted for each row, the technique of the second embodiment can also be applied to field inversion driving like that shown in FIG. 3. In addition, although FIG. 8 shows driving operation in regions A and B, driving operation in regions C and D is similar to that in the regions A and B.

Referring to FIG. 8, the interval of the first three lines corresponds to the region A, and the subsequent region corresponds to the region B. Assume that the feedthrough voltage ΔV in the region A is represented by ΔV1, and the feedthrough voltage ΔV in the region B is represented by ΔV2. In this case, in order to supply Vsig(LCD) with a constant magnitude to the pixel electrode 12, it suffices to supply the gradation signal Vsig(input) higher than Vsig(LCD) by ΔV1 in the interval of the region A and supply the gradation signal Vsig(input) higher than Vsig(LCD) by ΔV2 in the region B. This allows invariable application of the voltage VLCD that is a potential difference between Vsig(LCD) and the common signal Vcom and has a constant magnitude to each display pixel, thereby improving the display quality.

Figure 9:
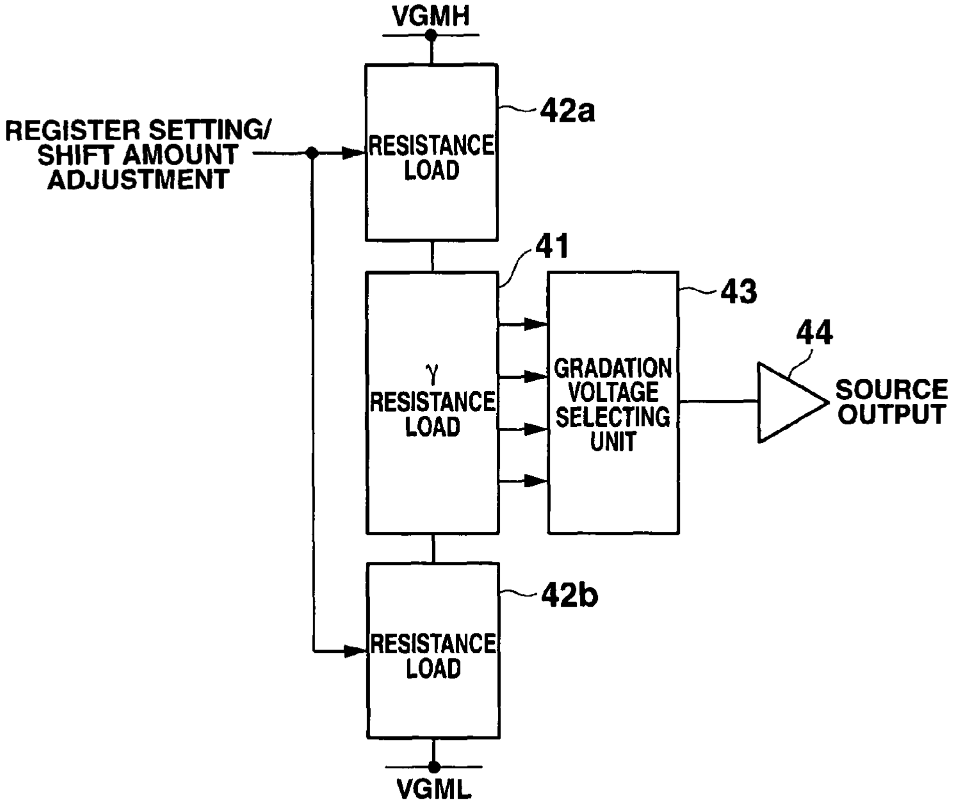
FIG. 9 is a circuit diagram showing the arrangement of the main part of a source driver in the second embodiment.

FIG. 9 is a circuit diagram showing the arrangement of the main part of the source driver in the second embodiment.

The circuit shown in FIG. 9 is provided in correspondence with each output terminal of the source driver. As shown in FIG. 9, this circuit comprises a γ resistance load 41, resistance loads 42*a* and 42*b*, a gradation voltage selecting unit 43, and a source output amplifier 44. The gradation voltage selecting unit 43 connects to the output terminal of a data latch circuit (not shown).

The γ resistance load 41 generates gradation signals corresponding to all the gradations that display data can take by resistance division. The gradation voltage selecting unit 43 selects a gradation signal corresponding to the gradation value of display data and applies it to the source output amplifier 44. A high potential voltage VGMH and a low potential voltage VGML are applied to the γ resistance load 41 through the resistance loads 42*a* and 42*b*. In this case, when line inversion driving is to be performed, for example, the gradation signal selected by the gradation voltage selecting unit 43 is inverted for each row in accordance with a polarity control signal output from the controller, thereby inverting the polarity of the gradation signal with respect to the common signal Vcom for each row.

For example, in the positive polarity interval of the first row shown in FIG. 8, the gradation voltage selecting unit 43 selects a gradation signal higher in potential than the common signal Vcom in accordance with the gradation value of display data. In contrast, for example, in the negative polarity interval of the second row, the gradation voltage selecting unit 43 selects a gradation signal lower in potential than the common signal Vcom in accordance with the gradation value of display data.

The resistance values of the resistance loads 42*a* and 42*b* are changed and set to values corresponding to the magnitude of the feedthrough voltage ΔV for each row in accordance with register setting made by the controller, thereby shifting the range of voltages applied to the γ resistance load 41 by a predetermined amount corresponding to the magnitude of the feedthrough voltage ΔV for each row. That is, for a row with the feedthrough voltage ΔV higher than a reference feedthrough voltage ΔV, the resistance value of the resistance load 42*a* is set to be smaller than a reference resistance value set with respect to the feedthrough voltage ΔV, and the resistance value of the resistance load 42*b* is set to be larger than the reference resistance value set with respect to the reference feedthrough voltage ΔV, thereby shifting the range of voltages applied to the γ resistance load 41 to the high voltage side by a predetermined amount with respect to the voltage range set with respect to the reference feedthrough voltage ΔV. For a row with the feedthrough voltage ΔV lower than the reference feedthrough voltage ΔV, in a positive polarity period, the resistance value of the resistance load 42*a* connected to the voltage VGMH is set to be larger than the reference resistance value, and the resistance value of the resistance load 42*b* connected to the voltage VGML is set to be smaller than the reference resistance value, thereby shifting the range of voltages applied to the γ resistance load 41 to the low voltage side by a predetermined amount with respect to the voltage range set with respect to the reference feedthrough voltage ΔV. This operation shifts the gradation signal to the high voltage side or the low voltage side by a voltage corresponding to the magnitude of the feedthrough voltage ΔV relative to a value set with respect to the reference feedthrough voltage ΔV. This allows obtainment of the signal Vsig(input) with a waveform like that shown in FIG. 9. Accordingly, when single gradation display is to be performed, even if the feedthrough voltage ΔV varies in magnitude, the constant voltage Vsig(LCD) can be applied to the pixel electrode 12.

The gradation voltage selecting unit 43 selects a gradation signal corresponding to the gradation level of display data from the gradation signals generated by the γ resistance load 41, and outputs the selected signal to the source output amplifier 44. The source output amplifier 44 amplifies the gradation signal from the gradation voltage selecting unit 43 in accordance with its own driving capability, and outputs the resultant signal to the pixel electrode 12 of the display pixel.

According to the above description, the resistance values of the resistance loads 42*a* and 42*b* are set for each row in accordance with the magnitude of the feedthrough voltage ΔV. However, the resistance values of the resistance loads 42*a* and 42*b* may be set for each of the regions A, B, C, and D of the display panel 10.

According to the above description, when line inversion driving is to be performed, a gradation signal selected by the gradation voltage selecting unit 43 is inverted for each row. However, it suffices to invert the potentials VGMH and VGML applied to the γ resistance load 41 through the resistance loads 42*a* and 42*b* for each row without inverting the gradation signal selected by the gradation voltage selecting unit 43.

As described above, according to the second embodiment, correcting the magnitude of a gradation signal output from the source driver in accordance with the magnitude of the feedthrough voltage ΔV for each row allows suppression of a deterioration in display quality due to differences in the feedthrough voltage ΔV, thereby improving the display quality.

Third Embodiment

The third embodiment of the present invention will be described next. According to the second embodiment, in consideration of differences in the feedthrough voltage ΔV for each row, the magnitude of a gradation signal output from the source driver is corrected. However, since the voltage VLCD applied to a display pixel corresponds to the potential difference between the gradation signal and the common signal, correcting the magnitude of the common signal can also control the voltage VLCD applied to the display pixel as in the second embodiment.

Figure 10:
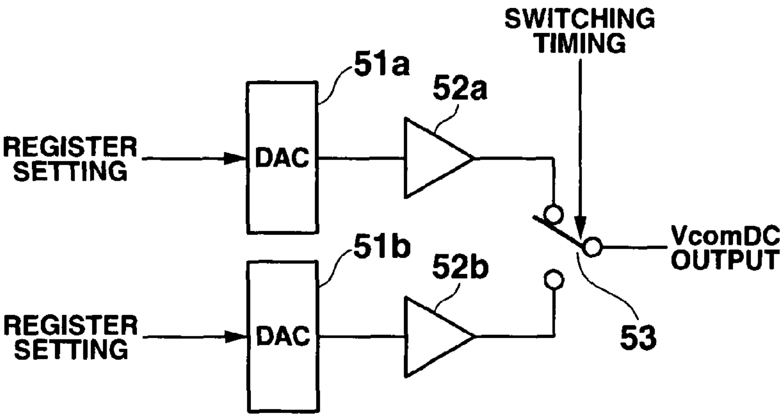
FIG. 10 is a circuit diagram showing the arrangement of the main part of a common signal output circuit in the third embodiment.

FIG. 10 is a circuit diagram showing the arrangement of the main part of a common signal output circuit according to the third embodiment.

The common signal output circuit shown in FIG. 10 comprises digital analog converters (DACs) 51*a* and 51*b*, common signal output amplifiers 52*a* and 52*b*, and a polarity switch 53.

The DAC 51*a* has a capacity corresponding to the register setting made by the controller, and generates a common signal lower in potential than a gradation signal in a positive polarity interval. The common signal output amplifier 52*a* amplifies the common signal from the DAC 51*a* in accordance with its own driving capability and outputs the resultant signal to the polarity switch 53.

The DAC 51*b* has a capacity corresponding to the register setting made by the controller, and generates a common signal higher in potential than a gradation signal in a negative polarity interval. The common signal output amplifier 52*b* amplifies the common signal from the DAC 51*b* in accordance with its own driving capability and outputs the resultant signal to the polarity switch 53.

The magnitudes of common signals set with respect to the DACs 51*a* and 51*b* are set in accordance with the magnitude of the feedthrough voltage ΔV for each row.

That is, in a positive polarity interval, for a row with the feedthrough voltage ΔV higher than a given reference feedthrough voltage ΔV, the magnitude of a common signal set for the DAC 51*a* is made smaller than that of a reference common signal set with respect to the reference feedthrough voltage ΔV. For a row with the feedthrough voltage ΔV lower than the reference feedthrough voltage ΔV, the magnitude of a common signal set for the DAC 51*a* is made larger than the reference common signal.

In a negative polarity interval, for a row with the feedthrough voltage ΔV higher than the reference feedthrough voltage ΔV, the magnitude of a common signal set for the DAC 51*b* is made smaller than that of the reference common signal set with respect to the reference feedthrough voltage ΔV. For a row with the feedthrough voltage ΔV lower than the reference feedthrough voltage ΔV, the magnitude of a common signal set for the DAC 51*b* is made smaller than the reference common signal. As indicated by Vsig(VLCD) in FIG. 8, when single gradation display is to be performed, even if the magnitude of the feedthrough voltage ΔV varies, the constant voltage Vsig(LCD) can be supplied to the pixel electrode 12.

The polarity switch 53 switches the polarity of a common signal to be output to a display pixel in accordance with a polarity control signal from the controller (not shown).

According to the above description, the magnitude of a common signal is set for each row in accordance with the magnitude of the feedthrough voltage ΔV. However, for example, it suffices to set the magnitude of a common signal for each of regions A, B, C, and D of the display panel 10.

As has been described above, according to the third embodiment, correcting the magnitude of a common signal from the common signal generating circuit for each row in consideration of differences in the feedthrough voltage ΔV allows improvement of the display quality.

The present invention has been described on the basis of the above embodiments. Obviously, however, the present invention is not limited to the above embodiments, and various modifications and applications of the embodiments can be made within the spirit and scope of the invention.

The above embodiments include inventions of various stages, and various inventions can be extracted by proper combinations of disclosed constituent elements. Assume that the above problems can be solved and the same effects as those described above can be obtained even if several constituent elements are omitted from all the constituent elements described in the embodiments. In this case, the arrangement obtained by omitting such constituent elements can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display driving apparatus that drives display pixels included in a display panel based on display data, the display pixels being arrayed in rows and columns, each pixel including a pixel electrode, and the display panel including a plurality of scanning lines arrayed in the rows and connected to respective display pixels, the apparatus comprising:

a signal generating circuit that generates a driving signal for sequentially setting the respective display pixels corresponding to the respective rows in a selected state, and that applies a signal voltage corresponding to a gradation value of the display data to a pixel electrode of each of the display pixels;

wherein the signal generating circuit includes a scanning side driving circuit and a correcting circuit;

wherein the scanning side driving circuit includes output terminals which output scanning signals to set the respective display pixels in the selected state;

wherein the output terminals are respectively connected to ends of the plurality of scanning lines of the display panel, via respective routed interconnections that are different in resistance values from each other, wherein the correcting circuit includes a waveform correcting circuit that: (i) differentiates degrees of roundness of waveforms of the scanning signals output from the respective output terminals, in accordance with correction amounts set to correspond to the respective resistance values of the routed interconnections, and (ii) brings the waveforms of the scanning signals respectively applied to the ends of the plurality of scanning lines via the respective routed interconnections, close to a same waveform, so as to bring amounts of voltage drops caused at the pixel electrodes of the display pixels of the rows close to predetermined amounts and bring a value of the signal voltage corresponding to the gradation value of the display data that is applied to each of the display pixels set in the selected state close to a same magnitude;

wherein the scanning side driving circuit further includes amplifying circuits provided to correspond to the respective output terminals to generate the scanning signals;

wherein the waveform correcting circuit includes a driving capability switching circuit that switches a driving capability of each of the amplifying circuits to levels different from each other, in accordance with the corresponding correction amount, and that differentiates the degrees of roundness of the scanning signals output to the output terminals from each other; and wherein the driving capability switching circuit includes a bias current setting circuit that switches a current value of a bias current supplied to each of the amplifying circuits to values different from each other, and that switches the driving capability of each of the amplifying circuits to the different levels.

2. The apparatus according to claim 1, wherein the amounts of voltage drops are feedthrough voltages generated at the pixel electrodes of the display pixels at trailing edges of the scanning signals.

3. A display apparatus that performs image display based on display data, the apparatus comprising:

a display panel having a display area in which each of a plurality of display pixels are arrayed, the display panel having scanning lines arrayed in a row direction, signal lines arrayed in a column direction, and pixel electrodes near intersections between the scanning lines and the signal lines; and a signal generating circuit that generates a driving signal for sequentially setting the display pixels corresponding to the respective scanning lines in a selected state, and that applies a signal voltage corresponding to a gradation value of display data to a pixel electrode of each of the display pixels;

wherein the signal generating circuit includes a scanning side driving circuit and a correcting circuit;

wherein the scanning side driving circuit includes output terminals which output scanning signals to set the respective display pixels in the selected state;

wherein the output terminals are respectively connected to ends of the plurality of scanning lines of the display panel, via respective routed interconnections that are different in resistance values from each other;

wherein the correcting circuit includes a waveform correcting circuit that: (i) differentiates degrees of roundness of waveforms of the scanning signals output from the respective output terminals, in accordance with correction amounts set to correspond to the respective resistance values of the routed interconnections, and (ii) brings the waveforms of the scanning signals respectively applied to the ends of the plurality of scanning lines via the respective routed interconnections, close to a same waveform, so as to bring amounts of voltage drops caused at the pixel electrodes of the display pixels of the rows close to predetermined amounts and bring a value of the signal voltage corresponding to the gradation value of the display data that is applied to each of the display pixels set in the selected state close to a same magnitude;

wherein the scanning side driving circuit further includes amplifying circuits provided to correspond to the respective output terminals to generate the scanning signals;

wherein the waveform correcting circuit includes a driving capability switching circuit that switches a driving capability of each of the amplifying circuits to levels different from each other, in accordance with the corresponding correction amount, and that differentiates the degrees of roundness of the scanning signals output to the output terminals from each other; and wherein the driving capability switching circuit includes a bias current setting circuit that switches a current value of a bias current supplied to each of the amplifying circuits to values different from each other, and that switches the driving capability of each of the amplifying circuits to the different levels.

4. The apparatus according to claim 3, wherein:

at least the signal generating circuit is provided along one edge side of the display area of the display panel, and the plurality of routed interconnections extend along an edge perpendicular to the edge side of the display area on which the signal generating circuit is provided.

5. The apparatus according to claim 3, wherein the amounts of voltage drops are feedthrough voltages generated at the pixel electrodes of the display pixels at trailing edges of the scanning signals.

* * * * *